Patented Sept. 29, 1936

2,056,026

UNITED STATES PATENT OFFICE 2,056,026

PLASTIC COMPOUND AND METHOD OF MAKING THE SAME

Douglas Frank Twiss, Wylde Green, Birmingham, and Albert Edward Toney Neale, Ward End, Birmingham, England, assignors to Dunlop Tire & Rubber Corporation, Buffalo, N. Y., a corporation of New York No Drawing. Application February 28, 1934, Serial No. 713,377. In Great Britain March 8, 1933

15 Claims. (Cl. 260—6)

This invention concerns improvements in the preparation of plastic compositions and is particularly concerned with the preparation of plastic compositions from saturated di- or poly-halogenized hydrocarbons of the $C_nH_{2n+2}$ class and/or unsaturated di-, or poly-halogen derivatives of unsaturated hydrocarbons.

These compositions are of use, for instance, in the preparation of rubber flooring and also, when incorporated into rubber, have the advantage of rendering the latter resistant to oils.

The object of the invention is to produce plastic compositions from saturated di- or poly-halogenized hydrocarbons of the $C_nH_{2n+2}$ class and/or unsaturated di- or poly-halogen derivatives of unsaturated hydrocarbons containing substantially no free sulphur and, if desired, to combine these compositions with rubber.

Free sulphur may be troublesome as, for instance, it tends to interfere with a vulcanization operation to which any co-mixed rubber may be submitted.

According to this invention we provide a process for preparing plastic compositions comprising treating di- or poly-halogenized hydrocarbons with one or more metallic thiosulphates and then decomposing the product to form a plastic composition containing carbon, hydrogen and sulphur.

The invention is further characterized in that the said halogenized hydrocarbons may be obtained from hydrocarbons of the $C_nH_{2n+2}$ class by substitution or from unsaturated hydrocarbons by an additive process. The said thiosulphates may be soluble in water and the halogenized hydrocarbons may be applied in a solvent miscible with water or may be applied in alcohol.

The reaction products of the halogenized hydrocarbons and the metallic thiosulphates may be converted into the plastic products by oxidizing, reducing, or by hydrolytic agents and the primary hydrolytic products may themselves be submitted to oxidation.

Examples of saturated di- or poly-halogenized hydrocarbons of the $C_nH_{2n+2}$ class are ethylene dichloride, ethylene dibromide, trimethylene dibromide, methylene dichloride, isoprene tetrabromide and methylene dibromide.

Examples of unsaturated di-, or poly-halogenized derivatives of unsaturated hydrocarbons are isoprene dibromide and the analogous halogen derivatives of butadiene. Mixtures of these di- or poly-halogenized hydrocarbons can also be employed.

An example of a metallic thiosulphate is sodium thiosulphate; other thiosulphates, however, can also be used such as calcium, potassium or ammonium.

Examples of oxidizing agents or means are oxygen, hydrogen peroxide, chlorine, iodine and electrolytic oxidation.

Examples of reducing agents or means are sodium hyposulphite (also known as sodium hydrosulphite) and electrolytic reduction.

Examples of hydrolytic agents are dilute sodium hydroxide, ammonia, and sodium carbonate or acids.

The action of the hydrolytic type of agent may also be combined with that of either an oxidizing agent or reducing agent.

Examples of carrying out the invention are as follows:

Example 1

A plastic material is prepared by boiling under a reflux condenser, a mixture of 38 grams of ethylene dichloride dissolved in 100 cc. of alcohol and 200 gms. of sodium thiosulphate in 225 cc. of water. The completion of the reaction between the chlorohydrocarbon and the thiosulphate is recognized by the formation of a homogeneous liquid and this occurs after about eight to ten hours from the commencement. The liquid is then just acidified with acetic acid, 250 cc. of hydrogen peroxide (20 vols.) is added and heating continued until a yellow, rubber-like product is formed. This material is washed with hot water and dried.

Example 2

A further preparation of plastic material is made wherein the oxidation of the intermediate product is effected by passing chlorine gas into the hot liquid and filtering off the plastic material produced. It is found necessary to repeat this in order to obtain the maximum yield.

A mixing substantially of the following composition, given in parts by weight—

| | |
|---|---|
| Rubber | 100 |
| Sulphur | 3 |
| Zinc oxide | 5 |
| Mercaptobenzthiazole | 1 |
| Stearic acid | 2 |
| Carbon black | 19 |
| Glue | 19 | is vulcanized and at the optimum cure the lowest swelling obtained in benzole after 24 hours at 25.5° C. is 232% by weight. Substitution of 19 parts of plastic material (as prepared in Examples 1 and 2) for 19 parts of glue in the above mixing results in a reduction of the swelling figure to 190%.

Example 3

The corresponding methylene compound is prepared in a similar manner to that described in Example 1. 42 grams of methylene dichloride is dissolved in 100 cc. of ethyl alcohol and refluxed with 250 grms. of sodium thiosulphate dissolved in 300 cc. of water. On completion of the reaction as shown by the formation of a single layer of liquid, the liquid is acidified with acetic acid, 300 cc. of 20 vol. hydrogen peroxide is added and the mixture heated until a yellow, rubber-like product separates. This is washed with hot water and dried. On replacing the glue in the basic mixing given in Example 2 by an equal weight of the methylene compound, a swelling figure of 196% is obtained.

Example 4

A plastic material which may, for convenience, be termed isoprene disulphide is prepared in like manner by boiling a solution of 46 grams of isoprene dibromide in benzene with 100 grms. of sodium thiosulphate in water until the clear aqueous layer becomes brown in appearance and of a viscous consistency. After acidification, oxidation is effected by the addition of 150 cc. of 20 vol. hydrogen peroxide and subsequent heating until a soft brown, spongy product is obtained. This is best dried by sheeting out on mixing rolls.

Replacement of the glue in the mixing given in Example 2 by an equal weight of isoprene disulphide prepared as described, results in a reduction on the swelling figure from 232% to 194%.

Example 5

A plastic material which, for convenience, may be termed isoprene tetrasulphide is prepared in the manner described in Example 4 but using 20 grms. of isoprene tetrabromide with the previously described amounts of sodium thiosulphate and hydrogen peroxide. The resulting product is similar in character to isoprene disulphide and the corresponding swelling figure given by the use of 19 parts of the tetrasulphide in the basic mixing is 205%.

Example 6

A reaction product of ethylene dichloride and sodium thiosulphate is prepared as in Example 1. The homogeneous liquid formed is acidified with concentrated hydrochloric acid and boiled under reflux condenser, oxidizing conditions being obtained on one occasion by the passage of air through the liquid and, on another occasion, by addition of 250 cc. of hydrogen peroxide. After washing and drying, the plastic material obtained is incorporated in the basic mixing to the extent of 19 parts and the corresponding swelling figure obtained is 147%.

A plastic material obtained from ethylene dichloride and sodium thiosulphate is also prepared in an autoclave with no oxidizing conditions other than the air naturally present; 20 parts of ethylene dichloride, 100 parts of sodium thiosulphate and 20 parts of alcohol are heated in an autoclave for approximately 10 hours at 160–180° C. The plastic material is formed directly and may be filtered off from the reaction liquid, washed and dried.

What we claim is—

1. A process for preparing plastic compositions which comprises reacting a metallic thiosulphate in non-acid solution with a halogenated aliphatic hydrocarbon of the class containing an even number of halogen atoms and containing hydrogen atoms to form a plastic composition containing carbon, hydrogen and sulphur.

2. A process according to claim 1 in which the said halogenized hydrocarbons are obtained from hydrocarbons of the $C_nH_{2n+2}$ class by substitution.

3. A process according to claim 1 in which the halogenized hydrocarbons are derived from unsaturated hydrocarbons by an additive process.

4. A process according to claim 1 in which the said thiosulphates are soluble in water.

5. A process according to claim 1 in which the halogenized hydrocarbons are applied in a solvent miscible with water.

6. A process according to claim 1 in which the halogenized hydrocarbons are applied in alcohol.

7. A process according to claim 1 in which the reaction products of the halogenized hydrocarbons and the metallic thiosulphates are converted into plastic products by oxidizing agents.

8. A process according to claim 1 in which the reaction products of the halogenized hydrocarbons and the metallic thiosulphates are converted into plastic products by reducing agents.

9. A process according to claim 1 in which the reaction products of the halogenized hydrocarbons and the metallic thiosulphates are converted into plastic products by hydrolytic agents.

10. A process according to claim 1 in which the reaction products of the halogenated hydrocarbons and the metallic thiosulphates are converted into plastic products by hydrolytic agents and in which the primary hydrolytic products are submitted to oxidation.

11. A process of making a plastic compound which comprises boiling a non-acid solution of a halogenated aliphatic hydrocarbon of the class containing an even number of halogen atoms and containing hydrogen atoms with a metallic thiosulphate and thereafter oxidizing.

12. The process of claim 11 in which the halogenated hydrocarbon is a saturated hydrocarbon.

13. The process of claim 11 in which the halogenated hydrocarbon is unsaturated.

14. The process of claim 11 in which the halogenated compound is an isoprene halogenated compound.

15. The process of making a plastic composition which comprises heating a halogenated aliphatic hydrocarbon of the class containing an even number of halogen atoms and containing hydrogen atoms and a thiosulphate in a non-acid medium in an autoclave in the presence of air.

DOUGLAS FRANK TWISS.
ALBERT EDWARD TONEY NEALE.